United States Patent [19]

Imazeki et al.

[11] 4,357,664
[45] Nov. 2, 1982

[54] TRACER CONTROL SYSTEM

[75] Inventors: Ryoji Imazeki; Takao Sasaki; Etsuo Yamazaki, all of Hachioji, Japan

[73] Assignee: Fujitsu Fanuc Limited, Tokyo, Japan

[21] Appl. No.: 190,658

[22] Filed: Sep. 25, 1980

[30] Foreign Application Priority Data

Sep. 28, 1979 [JP] Japan .................. 54-125021

[51] Int. Cl.³ .................. G06F 15/46; G05B 19/33
[52] U.S. Cl. .................. 364/474; 318/571; 318/578; 364/520
[58] Field of Search .................. 364/474, 475, 520, 512, 364/120, 107, 167-171; 318/571, 578, 579, 39; 409/67, 79, 80, 98, 121, 124, 126, 127

[56] References Cited

U.S. PATENT DOCUMENTS

| | | | |
|---|---|---|---|
| 3,743,910 | 7/1973 | Wise | 318/578 |
| 4,064,445 | 12/1977 | Wenzel | 318/578 |
| 4,117,385 | 9/1978 | Limbach et al. | 318/579 X |
| 4,157,679 | 6/1979 | Wenzel | 318/578 X |
| 4,164,694 | 8/1979 | Amsbury et al. | 318/578 |
| 4,224,670 | 9/1980 | Yamazaki | 364/474 |

Primary Examiner—Joseph F. Ruggiero
Attorney, Agent, or Firm—Staas & Halsey

[57] ABSTRACT

In one forward or backward trace path on a model, a jerk point in the surface configuration of the model is detected and the position of the jerk point is stored in a memory. The reduction of the trace velocity is started a predetermined distance short of the stored position of the jerk point in the trace direction and when a jerk point is detected again, the position of the jerk point previously stored in the memory is updated and the reduction of the trace velocity is released, thus achieving high accuracy trace.

6 Claims, 4 Drawing Figures

TRACER CONTROL SYSTEM

BACKGROUND OF THE INVENTION

1. Field of the Invention

The present invention relates to a tracer control system which, during the machining of a work following a model, starts deceleration control before a jerk point in the surface configuration of the model to thereby permit highly accurate tracing.

2. Description of the Prior Art

In the tracing, if a jerk point in the surface configuration of a model is traced at the same trace velocity as the other surface area, then the tool may bite into the work, making it difficult to achieve high accuracy in the tracing. A method that has heretofore been employed to avoid this is to provide a conductive film in the vicinity of the jerk point in the surface configuration of a model made of an insulating material and to establish a closed circuit when a stylus of a metal is moved into contact with the conductive film, thereby performing deceleration control of the tracing. With this method, however, since the conductive film is formed on the model surface, an error may occur and since the stylus slides directly on the conductive film, a bad contact may be caused therebetween; accordingly, no accurate control can be achieved.

Then, it has been proposed to store in a memory the position of the jerk point in the surface configuration of the model, discern the relationship of the stylus position in the trace path to the model and perform deceleration control of the tracing before the jerk point. With this method, in the case where the number of jerk points in the model configuration is small, their positions can all be stored in the memory, but in the case of a model having a complicated surface configuration, the number of jerk points increases and a large capacity memory is required.

SUMMARY OF THE INVENTION

An object of the present invention is to provide a tracer control system in which the position of each jerk point in the surface configuration of a model is detected and stored in a memory and the trace velocity at the jerk point is reduced to permit high accuracy tracing.

Another object of the present invention is to provide a tracer control system which permits the reduction of the capacity of a memory for storing the positions of jerk points in the surface configuration of a model.

Briefly stated, in the tracer control system of the present invention, a jerk point in the surface configuration of a model in the forward or backward tracing path is detected; the position of the jerk point is stored in a memory; the deceleration of tracing is started at a position a predetermined distance short of the position of the jerk point stored in the memory; and when another jerk point in the surface configuration of the model is detected, the memory is updated with the position of this jerk point and, at the same time, the tracing is released from deceleration and returned to its normal trace velocity.

DESCRIPTION OF THE PREFERRED EMBODIMENTS

Figure 1:
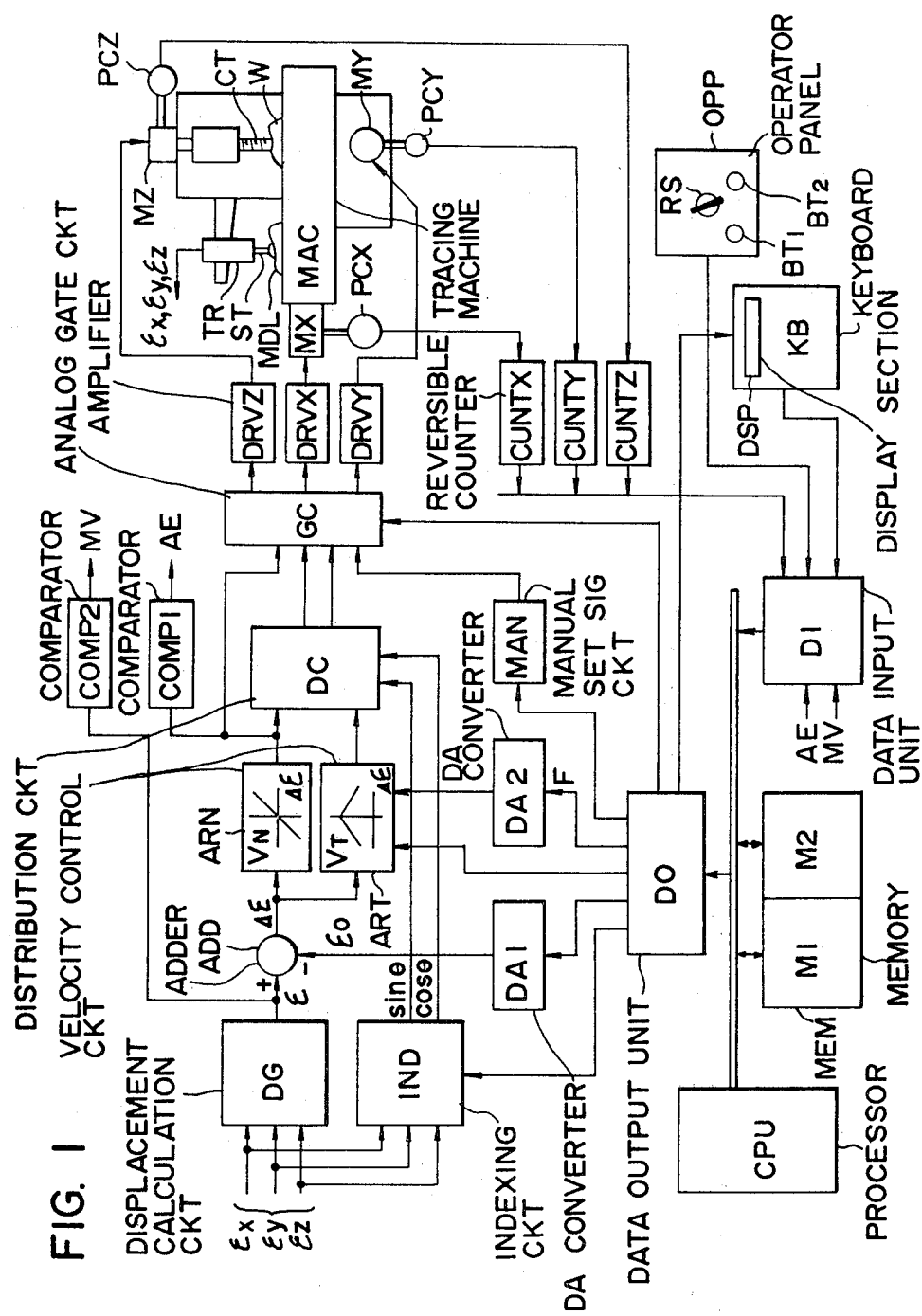
FIG. 1 is a block diagram illustrating an embodiment of the present invention.

FIG. 1 is a block diagram illustrating an embodiment of a tracer control system of the present invention. In FIG. 1, reference characters DG and IND respectively indicate a displacement calculation circuit and an indexing circuit which are supplied with displacement signals $\epsilon_x$, $\epsilon_y$ and $\epsilon_z$ from a tracer head TR; ARN and ART designate velocity control circuits; ADD identifies an adder; DC denotes a distribution circuit; COMP1 and COMP2 represent comparators; GC shows an analog gate circuit; DRVX, DRVY and DRVZ refer to amplifiers; MX, MY and MZ indicate servo motors; PCX, PCY and PCZ designate position detectors; MDL identifies a model; ST denotes a stylus; CT represents a cutter; W shows a work; MAC refers to a tracing machine; CUNTX, CUNTY and CUNTZ indicate reversible counters which count pulses from the position detectors to indicate the current position of the stylus; MAN designates a manual set signal circuit; OPP identifies an operator panel; RS denotes a setting dial for velocity or the like; BT1 and BT2 represents push buttons; KB shows a keyboard; DSP refers to a display; DI indicates a data input unit; MEM designates a memory composed of a data memory part M1 and a control program part M2; DO identifies a data output unit; CPU denotes a processor; and DA1 and DA2 represent D-A converters.

The stylus ST held in contact with the surface of the model MDL is fed by the servo motors and the displacement calculation circuit DG derives a composite displacement signal $\epsilon = \sqrt{\epsilon_x^2 + \epsilon_y^2 + \epsilon_z^2}$ from displacement signals $\epsilon_x$, $\epsilon_y$ and $\epsilon_z$ corresponding to the displacement of the stylus ST, and the indexing circuit IND provides direction-of-displacement signals $\sin\theta$ and $\cos\theta$. The composite displacement signal $\epsilon$ is applied to the adder ADD to obtain a difference $\Delta\epsilon$ between the composite signal $\epsilon$ and a reference displacement signal $\epsilon_0$, which difference $\Delta\epsilon$ is provided to the velocity control circuit ARN and ART to obtain a normal-direction velocity signal $V_N$ and a tangential-direction velocity signal $V_T$. These signals $V_N$ and $V_T$ are applied to the distribution circuit DC to yield a velocity command signal in accordance with the direction-of-displacement signals $\sin\theta$ and $\cos\theta$, and the velocity command signal thus obtained is supplied to the analog gate circuit GC. The velocity command signal is then provided to that one of the amplifiers DRVX, DRVY and DRVZ which is selected by the analog gate circuit GC. By the amplified velocity command signal, the servo motor corresponding to the selected amplifier is driven to feed the cutter CT and the tracer head TR in ganged relation to each other. Since the operations described above are already well-known in the art, no further detailed description will be given thereof.

In the approach operation, until the stylus ST moves into contact with the model MDL, the processor CPU reads out data of an approach axis, an approach direction and an approach velocity from the memory MEM and activates the amplifier, for example, DRVZ via the data output unit DO, causing the servo motor MZ to bring down the tracer head TR and the cutter CT. Before the stylus ST is brought into contact with the model MDL, the displacement signals $\epsilon_x$, $\epsilon_y$ and $\epsilon_z$ are zero, and accordingly the difference signal $\Delta\epsilon$ remains to be equal in absolute value to the reference displacement signal $\epsilon_0$. When the composite displacement signal $\epsilon$ has become equal to the reference displacement signal $\epsilon_0$ as a result of contacting of the stylus ST with the model MDL, the comparator COMP1 detects that $\Delta\epsilon = \epsilon - \epsilon_0 = 0$, and applies an approach end signal AE to the data input unit DI. The approach end signal AE is read out by the processor CPU to detect the completion of approach and then tracing is started.

The memory MEM has stored therein both way scan trace, one way scan trace and contour trace modes, a trace direction, a trace velocity, a pick feed direction, a pick feed velocity, a pick feed amount, a trace turning position and so forth. With the start of tracing, the processor CPU reads out the stored contents of the memory MEM and performs tracer control.

In the case where the surface configuration of the MDL has changed suddenly, the composite signal $\epsilon$ becomes large and it is detected by the comparator COMP2 that the variation has exceeded a preset value, and then a jerk signal MV is provided to the data input unit DI. Assuming that tracer control in the X-Z plane is taking place, the contents of the reversible counters CUNTX and CUNTZ at the time of the jerk-point signal being obtained indicate the position of the jerk point. Accordingly, by writing the contents of the reversible counters CUNTX and CUNTZ in the memory MEM under the control of the processor CPU, the position of the jerk point is stored; in this way, jerk points are detected and their positions are stored in the memory MEM in connection with one forward trace path the end of which is detected by coincidence of the stored trace turning position with the contents of the reversible counters CUNTX and CUNTZ.

In the one-way scan trace, the tracer head TR is quickly returned and in the both-way scan trace, the trace direction is reversed after pick feed.

Figure 2A:
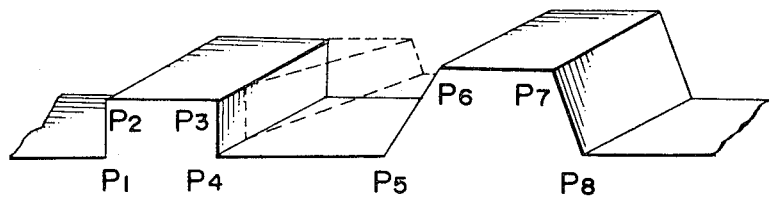
FIGS. 2A and 2B are explanatory of a model and the position of deceleration.

For example, when the model MDL is such as shown in FIG. 2A, points $P_1$ to $P_8$ are detected as jerk points in the surface of the model and their positions are written in the memory MEM. The positions of the jerk points $P_1$ to $P_8$ do not vary in the case of the solid-line configuration but vary in the case of the broken-line configuration. Since the amount of pick feed is very small, however, the variation in the position of each jerk point relative to adjacent ones of them is slight in almost all cases. Then, the positions of jerk points thus detected in the previous trace are used as jerk points in the next trace and the deceleration control is started a predetermined distance short of each jerk point. And in this trace, jerk points are detected again and their position are written in the memory MEM to update it.

As the jerk point updating means, it is also possible to obtain jerk points in the next trace by extrapolation from data of the previous and the current trace and write them in the memory MEM to update it.

In the control described above, when detecting that the difference between the contents of the reversible counters CUNTX and CUNTZ and the position of a jerk point stored in the memory has reached a predetermined value, the processor CPU provides a deceleration command, by which the trace velocity during deceleration stored in the memory is read out therefrom and provided via the data output unit DO to the D-A converter DA2, deriving therefrom a commanded velocity signal indicating a low speed. And by the provision of the jerk point signal MV from the comparator COMP2, it is detected that the stylus ST has passed through the jerk point in the surface configuration of the model MDL, and the deceleration control is released.

Figure 2B:
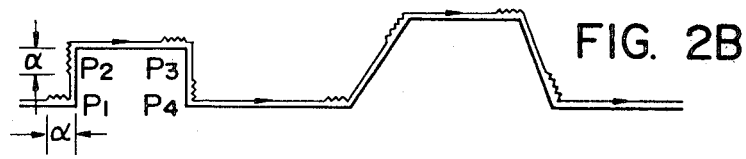
Figure 3:
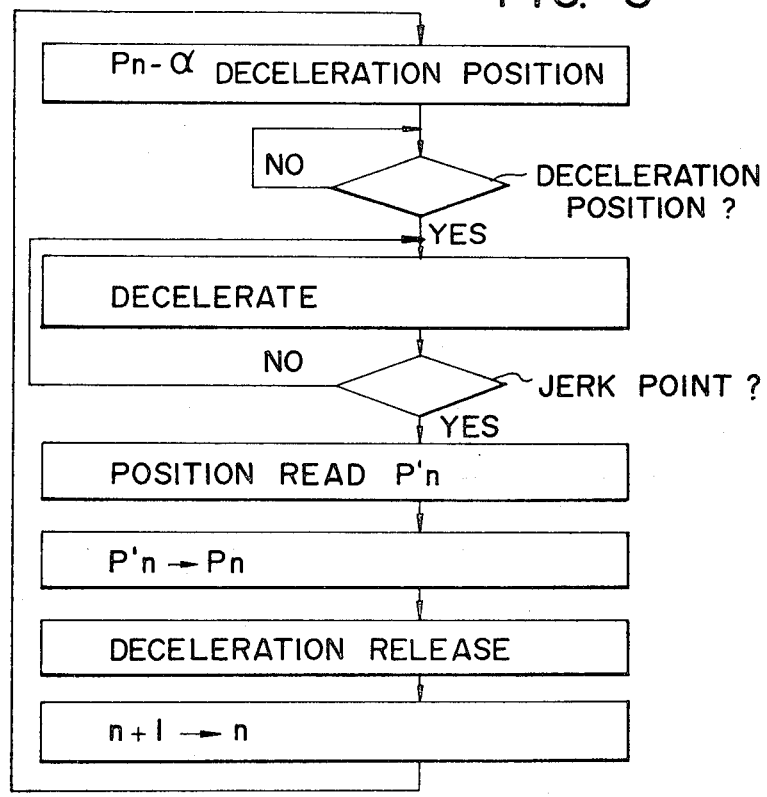
FIG. 3 is a flowchart explanatory of the operation of the embodiment shown in FIG. 1.

FIG. 3 shows a flowchart explanatory of an example of the operation described above. Letting the distance of deceleration by represented by $\alpha$ as shown in FIG. 2B, when the stylus lies at the position that $\alpha$ is subtracted from the position of the jerk point $P_n$ (n = 1, 2, 3, ...), that is, at a deceleration start position, the deceleration is started and it is checked whether or not the jerk point is one in the surface configuration of the model MDL; in the case of the jerk point in the model surface, its position $P_n'$ is read in the memory, wherein the previous jerk point $P_n$ is updated by $P_n'$, and the deceleration is released. And, using this jerk point as the next jerk point $P_n$, the same operation as described above is repeated for a jerk point $P_{n+1}$.

The detection of a jerk point can also be achieved by comparing the amount of change in the composite displacement signal $\epsilon$ derived from the displacement calculation circuit DG with a predetermined value. In the both-way scan trace, it is also possible to update the positions of jerk points by detecting them in either one or both of forward and backward trace paths.

As has been described in the foregoing, according to the present invention, jerk points in the surface configuration of a model are detected along a trace path and stored in a memory and deceleration control is started at a position short of each jerk point. At the same time, if a new jerk point is detected in the vicinity of the jerk point, the content of the memory is updated by the position of the new jerk point. Accordingly, the capacity of the memory used need not be large enough to store all jerk points of the model but may be enough to store jerk points in one forward or backward trace path alone; therefore, the circuit arrangement can be simplified and hence is economical. Further, the tracing of jerk points can be performed by the deceleration control with high accuracy.

It will be apparent that many modifications and variations may be effected without departing from the scope of the novel concepts of this invention.

What is claimed is:

1. A tracer control system for starting deceleration control before a jerk point in the surface configuration of a model a predetermined surface portion of which is to be traced along a trace path, said system comprising a stylus attached to a tracer head, said tracer head providing displacement signals corresponding to the displacement of said stylus with respect to said tracer head, and said system including means for calculating a composite displacement signal and direction-of-displacement signals from said displacement signals, said trace path being constituted of plural sequential tracings of said tracer head for scanning the portion of said model to be traced, each said sequential tracing having a correspondence to the prior sequential tracing, for providing said scanning in a predetermined mode over said portion of said model, said system comprising:

detecting means for detecting each jerk point in each sequential tracing, said detecting being based on said displacement signals;

a memory for storing a predetermined portion of the positional information of each said detected jerk point until at least during the next one of said sequential tracings in the trace path;

speed reduction means for reduction of the trace velocity at a predetermined interval before the respective positional information of each jerk point stored in the memory as a result of having been detected at least during the prior sequential tracing;

updating means, when a jerk point is detected in a sequential tracing that corresponds to a jerk point whose positional information was stored in the prior tracing, for updating the memory by replacing the previously stored positional information with the respective newly detected positional information; and means for subsequently releasing the reduction of the trace velocity after said detection of each said jerk point.

2. The system of claim 1, wherein the detecting means comprises means for comparing the amount of variation in the composite displacement signal with a predetermined value for said detecting of said jerk points.

3. The system of claim 1 or 2, comprising reversible counters for indicating the positional information of the tracer head at the moment of detection of each said jerk point by the detecting means.

4. The system of claim 1 or 2, comprising means for providing said scanning in a predetermined mode so that said predetermined surface portion of said model to be traced is traced by said successive tracings in a selected one of a one-way scan, a two-way scan and a contour scan tracing mode.

5. The system of claim 1 or 2, comprising means for storing in said memory the detected positional information from at least two of said sequential tracings of each said corresponding jerk point, and for extrapolating therefrom, for controlling the operation of said speed reduction means in the subsequent sequential tracing.

6. The system of claim 1 or 2, each said corresponding jerk point being so identified as a result of being detected during the particular trace velocity reduction for the stored positional information of a jerk point of the prior successive tracing.

* * * * *

UNITED STATES PATENT AND TRADEMARK OFFICE
CERTIFICATE OF CORRECTION

PATENT NO. : 4,357,664
DATED : 2 Nov. 1982
INVENTOR(S) : RYOJI IMAZEKI et al

It is certified that error appears in the above-identified patent and that said Letters Patent is hereby corrected as shown below:

Column 4, line 6, "by" should be --be--.

Signed and Sealed this

Fifteenth Day of February 1983

[SEAL]

Attest:

GERALD J. MOSSINGHOFF

Attesting Officer

Commissioner of Patents and Trademarks